United States Patent [19]
Kumakura

[11] Patent Number: 5,301,177
[45] Date of Patent: Apr. 5, 1994

[54] DEVICE FOR SIMULTANEOUSLY LOADING TWO DIFFERENT KINDS OF RECORDING MEDIA

[75] Inventor: Junzo Kumakura, Kanagawa, Japan
[73] Assignee: Sony Corporation, Tokyo, Japan
[21] Appl. No.: 920,974
[22] Filed: Jul. 28, 1992
[30] Foreign Application Priority Data
   Aug. 2, 1991 [JP] Japan .................... 3-216501
[51] Int. Cl.⁵ .................... G11B 33/02; G11B 23/00
[52] U.S. Cl. .................... 369/75.2; 369/258
[58] Field of Search .................... 360/94, 99.06, 99.07, 360/15; 369/75.1, 258, 75.2

[56] References Cited
U.S. PATENT DOCUMENTS

| | | | |
|---|---|---|---|
| 5,054,015 | 10/1991 | Tsukihashi et al. | 369/75.1 X |
| 5,062,100 | 10/1991 | Verhoeuen et al. | 369/77.2 X |
| 5,119,358 | 6/1992 | Soga | 369/75.2 X |
| 5,124,854 | 6/1992 | Iyota et al. | 360/99.06 |

FOREIGN PATENT DOCUMENTS 8803315 5/1988 PCT Int'l Appl. .................... 369/258

Primary Examiner—Edward K. Look
Assistant Examiner—Hoang Nguyen
Attorney, Agent, or Firm—Lewis H. Eslinger; Jay H. Maioli

[57] ABSTRACT

A loading device includes a first tray for holding a disk, positioned above and in register with a second tray for holding a cassette, and a mechanism for simultaneously carrying the first and second trays between extracted positions outside of the loading device and retracted positions inside of the loading device. The loading device houses a disk recording and/or reproducing device and a cassette recording and/or reproducing device, and the carrying mechanism carries the first tray to the disc recording and/or reproducing device and the second tray to the cassette recording and/or reproducing device.

5 Claims, 17 Drawing Sheets

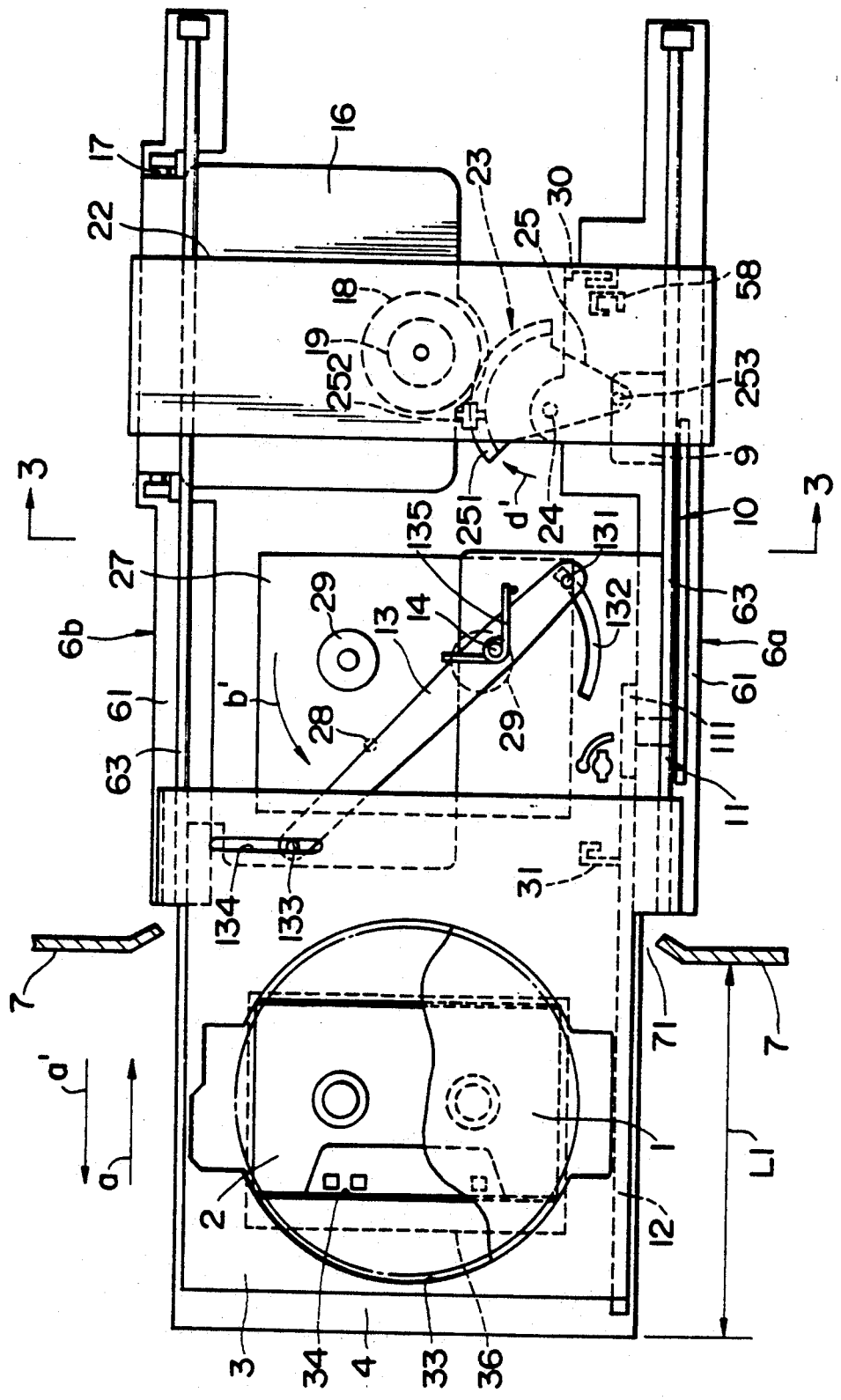

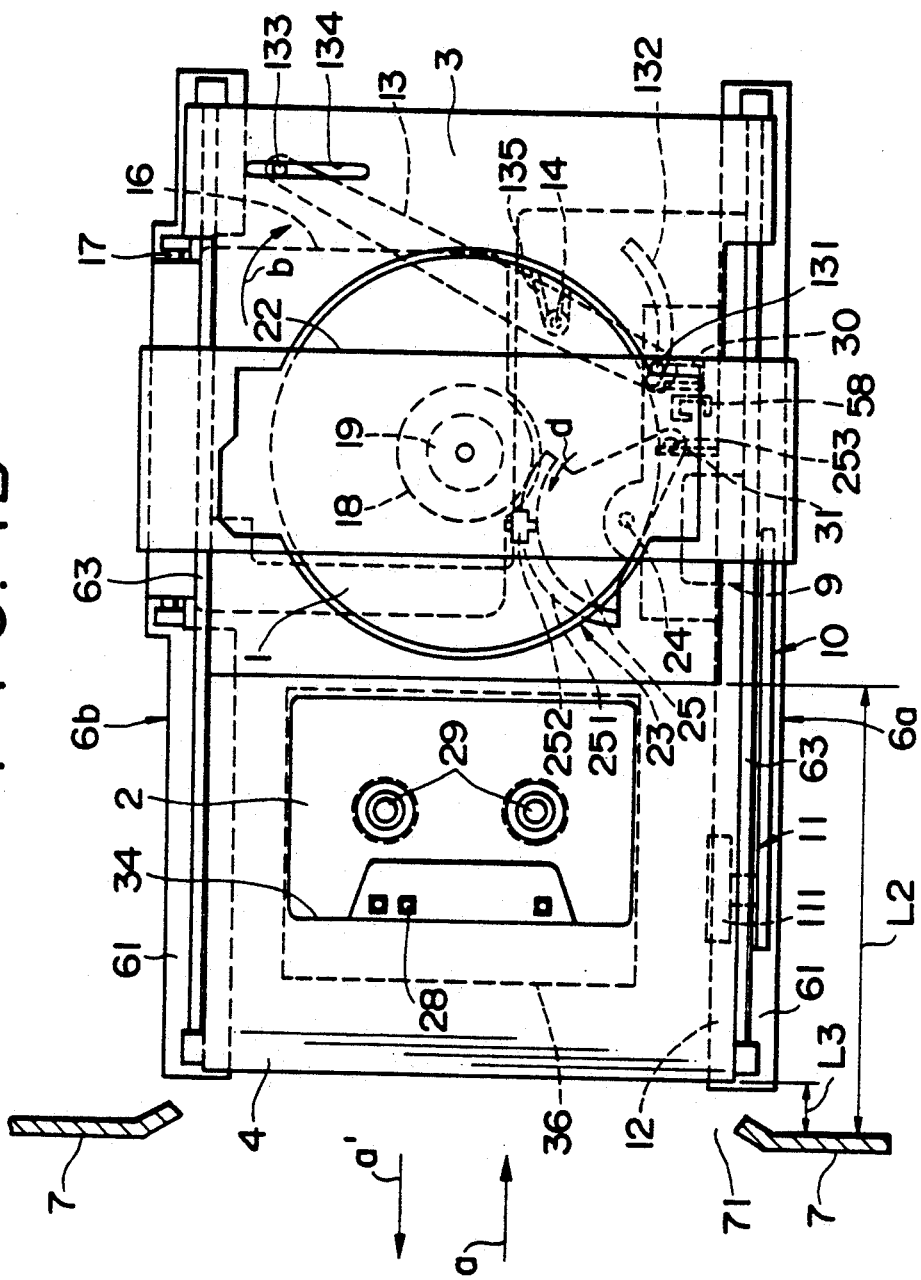

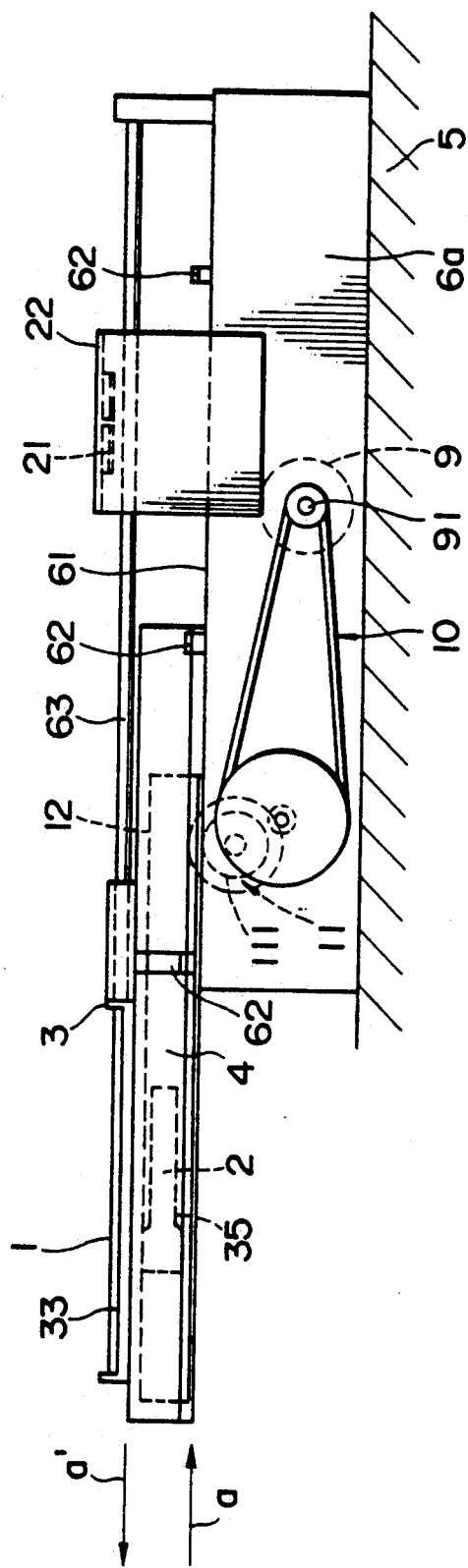

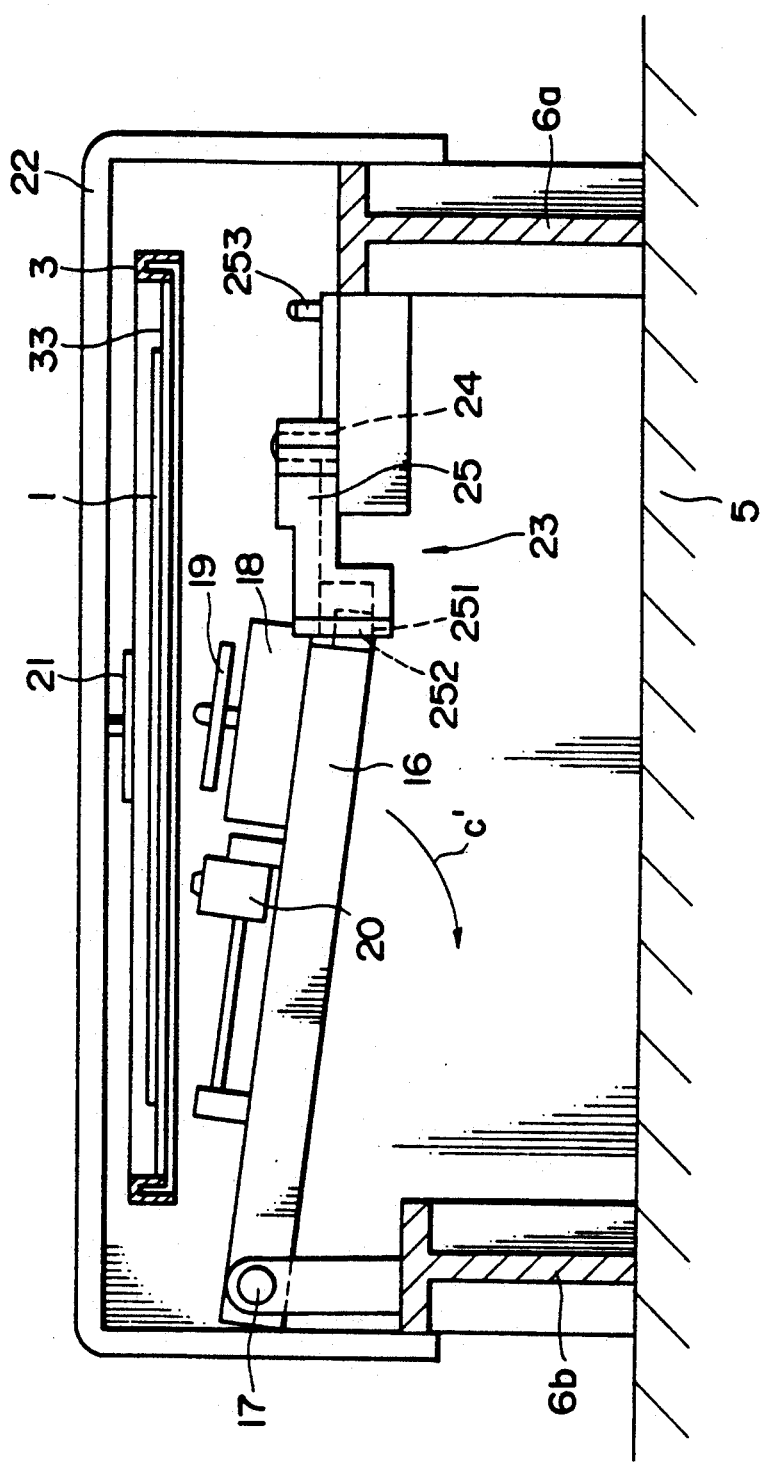

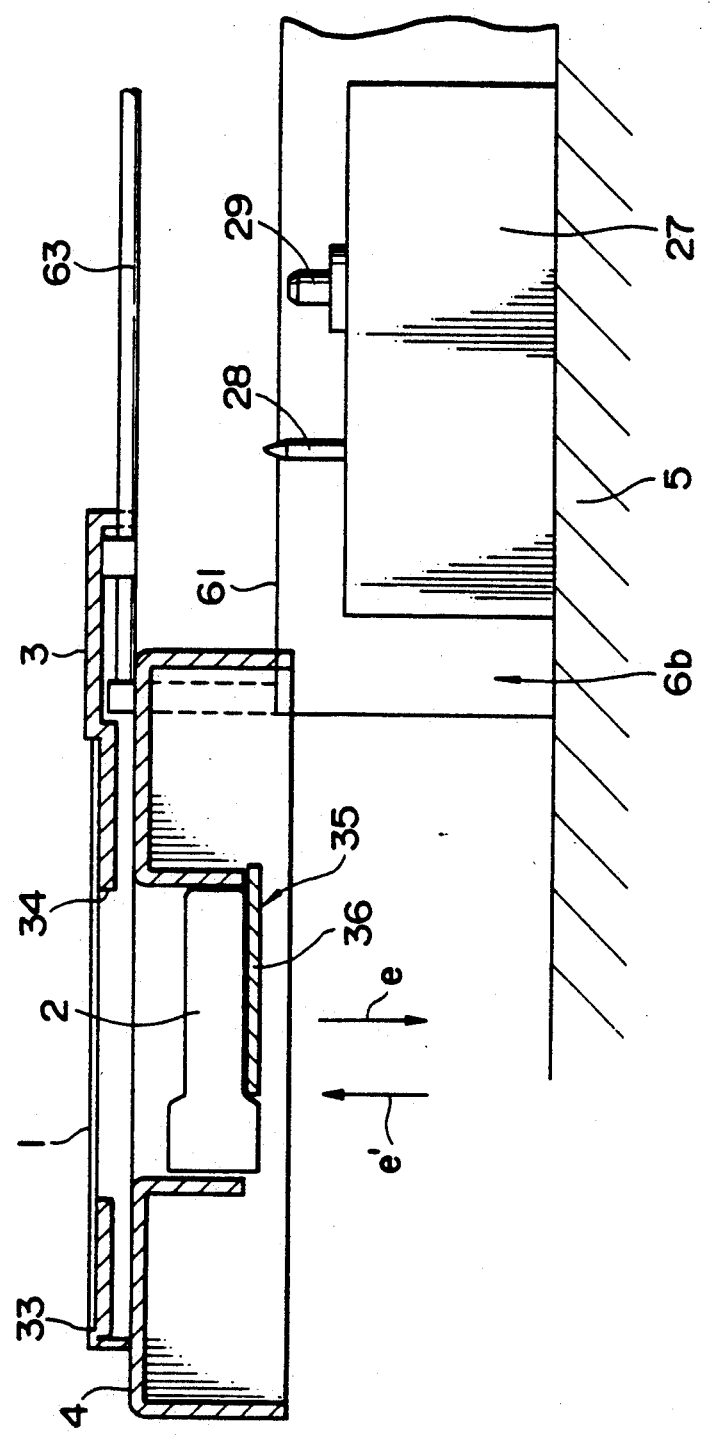

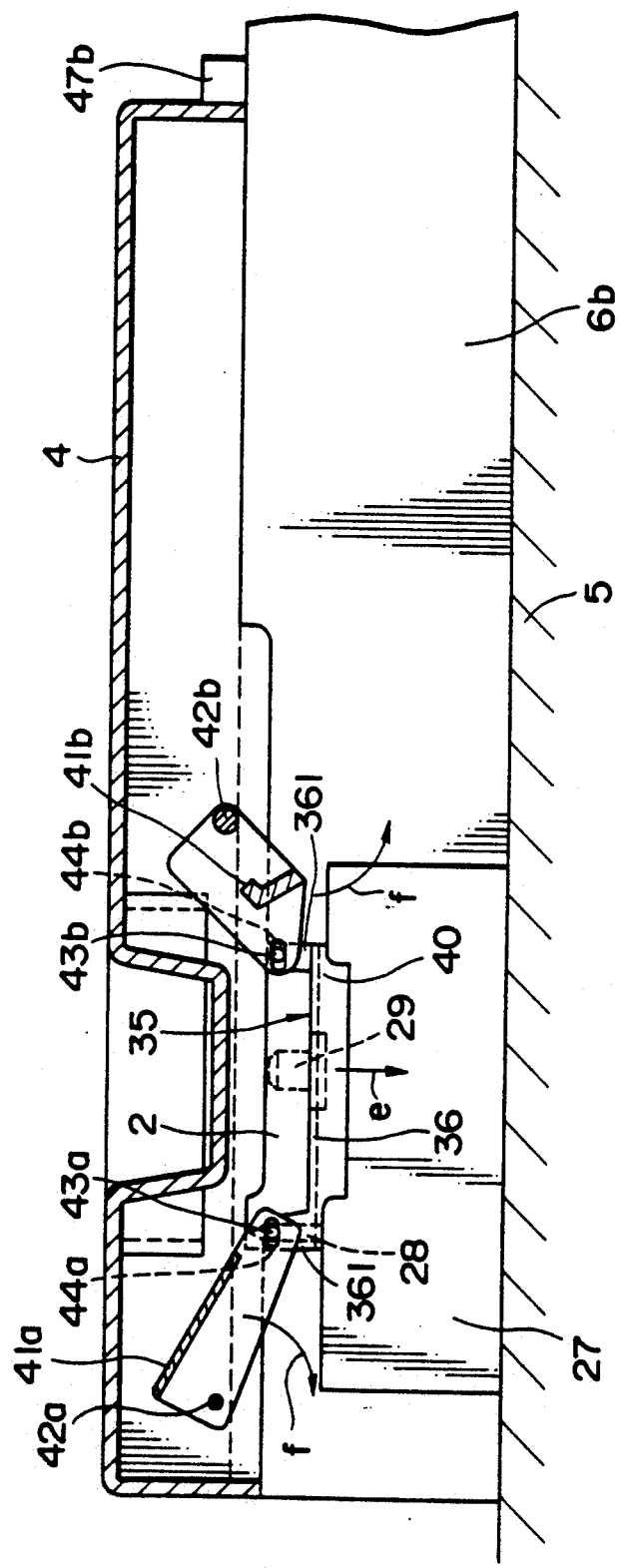

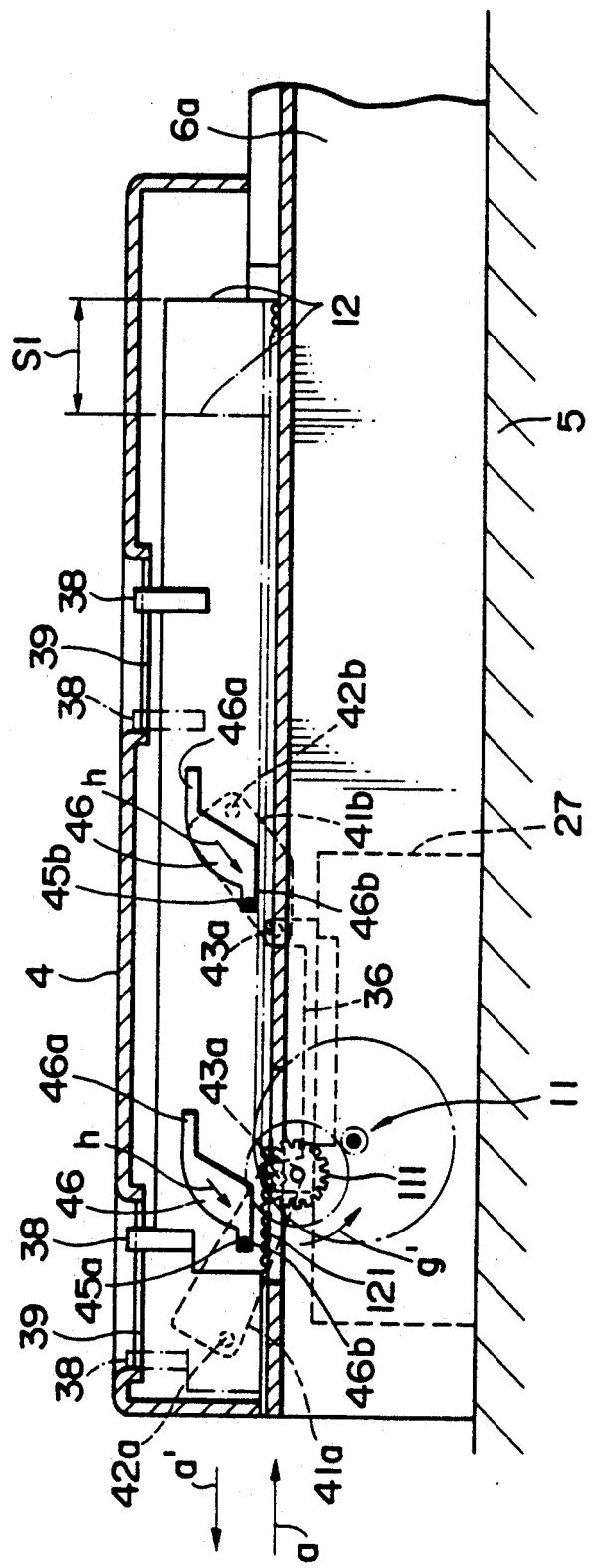

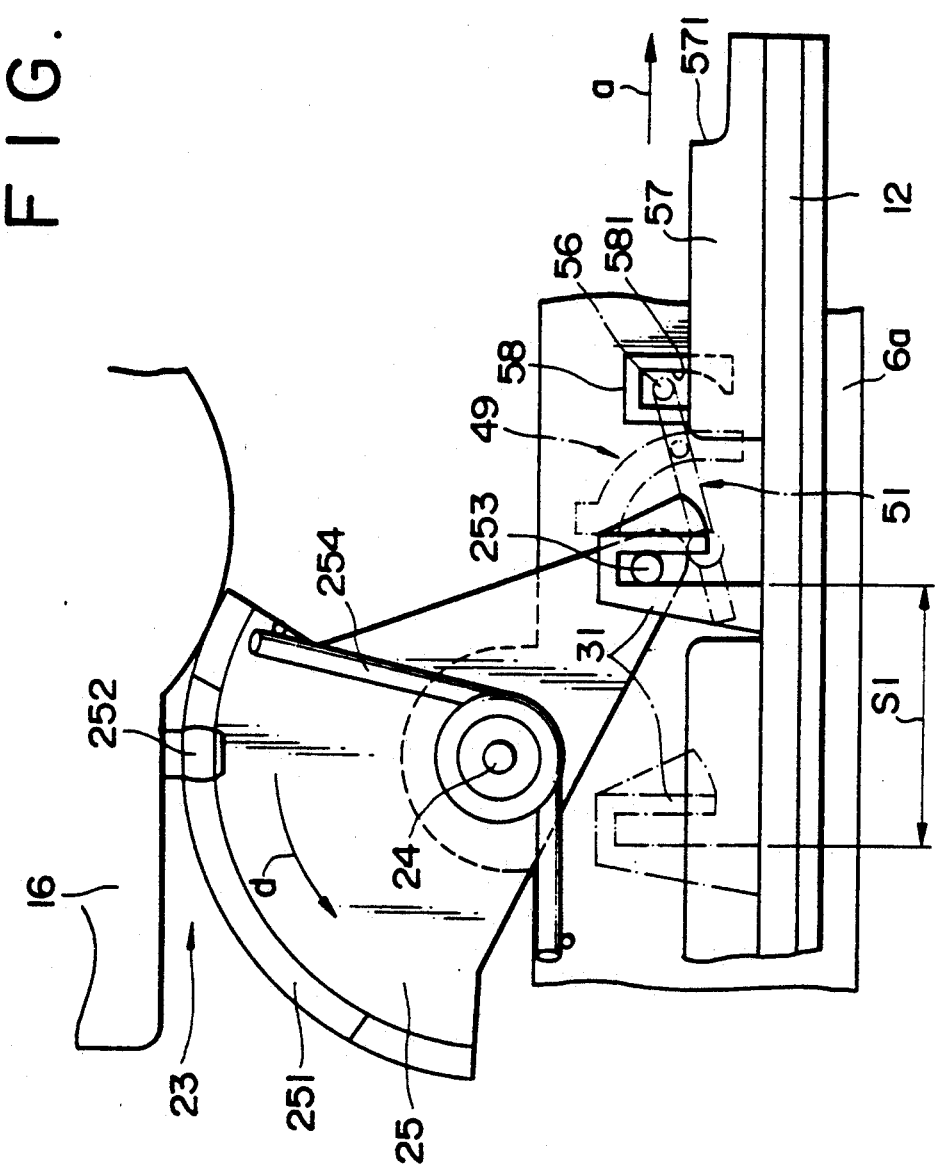

DEVICE FOR SIMULTANEOUSLY LOADING TWO DIFFERENT KINDS OF RECORDING MEDIA

BACKGROUND OF THE INVENTION

1. Field of the Invention

The present invention relates to a loading device used for a recording/reproducing device capable of simultaneously loading two kinds of recording mediums, for example, a disk (compact disk or the like) and a cassette (tape cassette or the like) for recording and/or reproducing.

2. Description of the Prior Art

A known integral recording/reproducing device for a CD (compact disk) with a cassette (tape cassette) has a structure of loading the CD and the cassette independently by two loading mechanisms, that is, a CD loading mechanism and a cassette loading mechanism wherein the CD and the cassette are arranged laterally in two rows and in parallel to each other.

However, the loading system of the above-mentioned integral recording/reproducing device for a CD and cassette has the following disadvantages: it is poor in space efficiency and hence requires an enlarged lateral width of the recording/reproducing device because of using a CD loading mechanism and a cassette loading mechanism wherein the CD and the cassette are arranged laterally in two rows and in parallel to each other; and further it becomes complex and hence increases the production cost because of using two loading mechanisms of the CD loading mechanism and the cassette loading mechanism independently operated.

Accordingly, an object of the present invention is to simultaneously improve the space efficiency and simplify the structure in a recording/reproducing device capable of simultaneously loading the disk and the cassette for recording and/or reproducing.

BRIEF DESCRIPTION OF THE DRAWINGS

FIGS. 1A and 1B are plan views showing unloading and loading states of a whole recording/reproducing device according to one embodiment of the present invention;

FIGS. 2A and 2B are side views showing the unloading and loading states of the whole recording/reproducing device;

FIGS. 3A and 3B are cross-sectional views taken on line 3—3 of FIG. 1 showing the unloading and loading states of a disk deck;

FIGS. 5A and 5B are cross-sectional views taken on line 5—5 of FIG. 4 showing the unloading and loading states of the cassette;

FIGS. 7A and 7B are cross-sectional views taken on line 7—7 of FIG. 6 for explaining a cassette loading mechanism;

FIGS. 8A and 8B are cross-sectional views taken on line 8—8 of FIG. 6 for explaining the cassette loading mechanism; and FIGS. 9A to 9C are plan views for explaining a locking mechanism for a rack plate to the cassette tray.

DETAILED DESCRIPTION OF THE PREFERRED EMBODIMENT

Figure 2B:
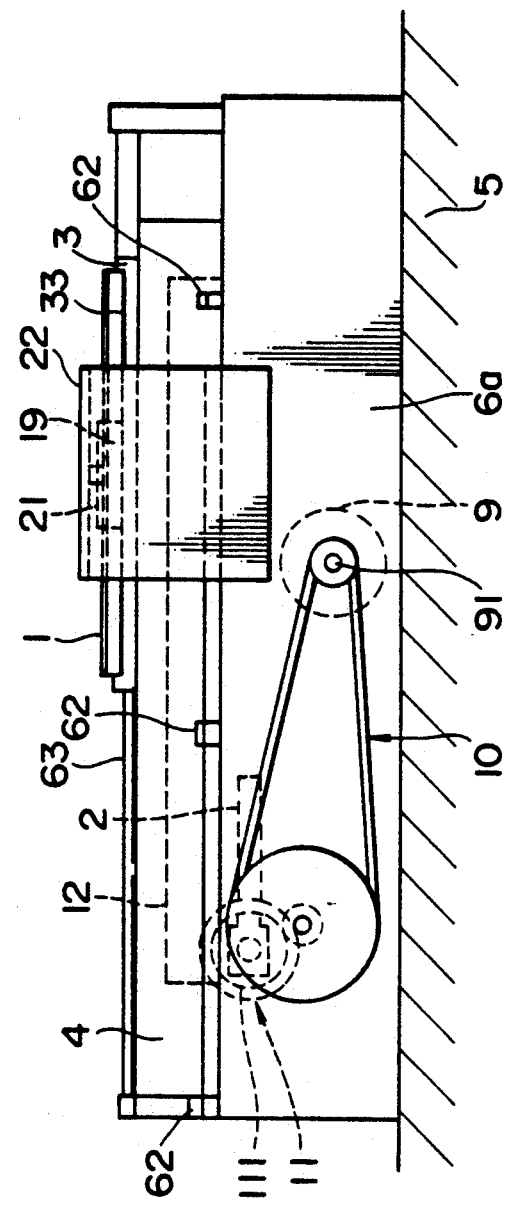

Hereinafter, one embodiment of a loading device according to the present invention will be described in detail with reference to the accompanying drawings.

This loading device is adapted to simultaneously load a CD (compact disk) 1 and a cassette 2 (tape cassette) for recording and/or reproducing and to record and/or reproduce them.

Referring to FIGS. 1A to 5B, the structure of the loading device will be briefly explained.

In this loading device, a disk tray 3 and a cassette tray 4 are vertically overlapped in two stages in such a manner as to be horizontally movable in the same longitudinal direction (in the direction of the arrow <a> or <a'> in FIGS. 1A and 1B).

In the above, a pair of right and left attachment bases 6a and 6b serving as guides are attached, horizontally and in parallel to each other, on a chassis 5. Both lateral ends of the (perpendicular to the direction of the arrow <a> or <a'>) of the cassette tray 4 overlapped on the lower side are respectively placed on horizontal guide faces 61 or both the attachment bases 6a and 6b and are guided by a plurality of guides 62, to be thus movable in the direction of the arrow <a> or <a'>. Also, the disk tray 3 overlapped on the upper side is guided by a pair of guide shafts 63 horizontally attached along the upper portions of both the attachment bases 6a and 6b, to be thus movable in the direction of the arrow <a> or <a'>.

The disk tray 3 and the cassette tray 4 are freely reciprocated in the direction of the arrow <a> or <a'> between a backward position projected from an opening 71 of a front panel 7 to the outside in the direction of the arrow <a'> by a projection amount L1 (in the trays 3 and 4, this amount being approximately similar to each other) as shown in FIGS. 1A and 2A, and a forward position retracted inside the front panel 7 as shown in FIGS. 1B and 2B. In this case, the retractable amount L2 of the disk tray 3 from the opening 71 to the inside of the front panel 7 is set to be larger than the retractable amount L3 of the cassette tray 4 is. Accordingly, the disk tray 3 and the cassette tray 4 can be reciprocated in the direction of the arrow <a> or <a'> with different strokes, that is, a large stroke for the disk tray 3 and a small stroke for the cassette tray 4.

A motor shaft 91 of a motor 9 attached on the one attachment base 6a is interlocked with a belt transmission mechanism 10 and a gear train 11 attached on the attachment base 6a. A drive gear 111 in the final stage of the gear train 11 drives a rack plate 12 attached in parallel to the attachment base 6a along one side end of the cassette tray 4.

An interlocking lever 13 as an interlocking means is attached on the upper portion of the rear end side (in the direction of the arrow <a>) of the cassette tray 4 through a supporting shaft 14 movably in the direction of the arrow <a> or <a'>. A pin 131 passing through the one end of the interlocking lever 13 is guided at the lower end by a circular arc hole 132 formed on the cassette tray 4. Meanwhile, a pin 133 attached on the upper portion of the other end of the interlocking lever 13 is freely fitted, from the bottom, to a slot 134 perpendicular to the moving direction of the arrow <a> or <a'> and formed on the rear end side (side of the arrow <a>). In addition, the interlocking lever 13 is biased in the direction of the arrow <b'> by a spring 135.

Figure 3B:
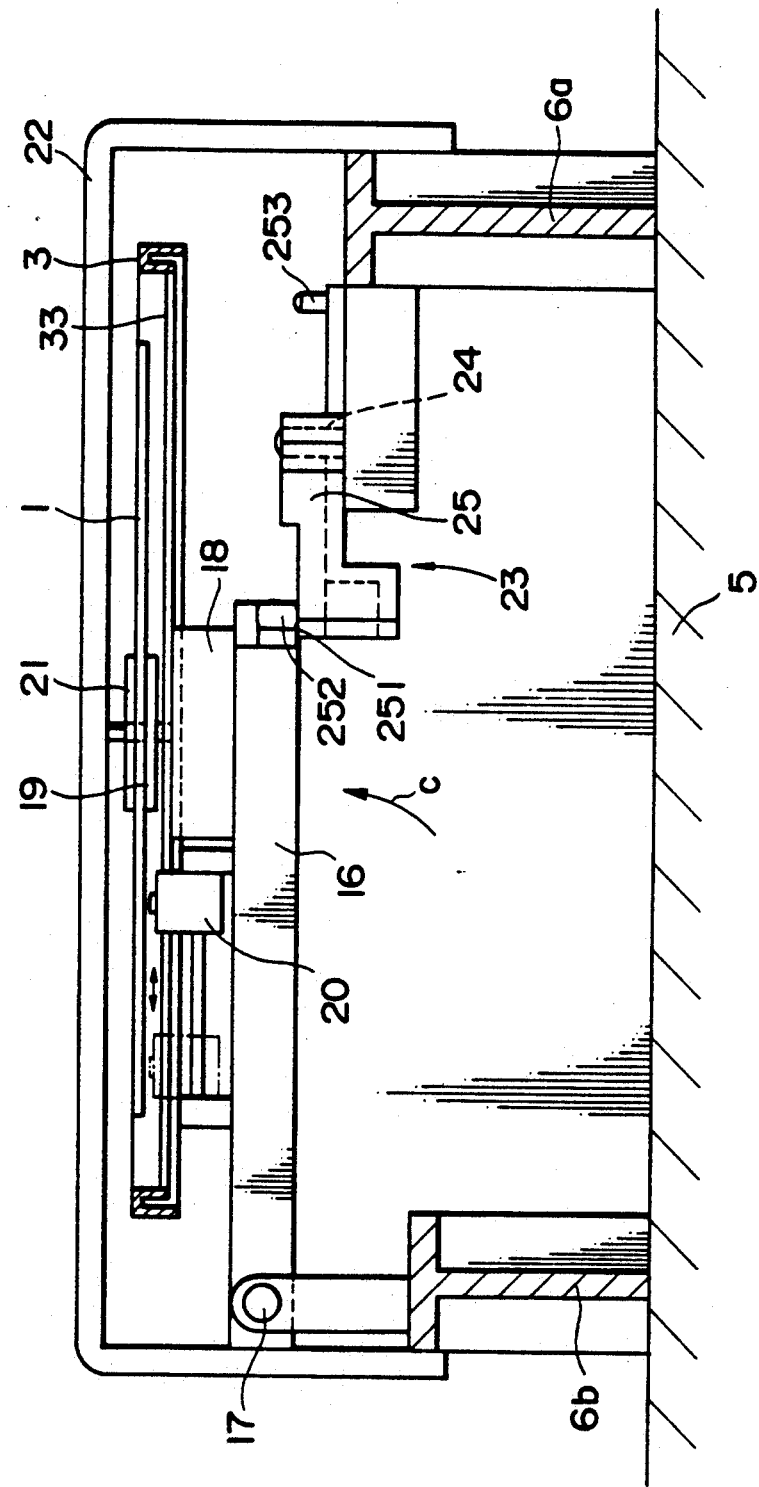
Figure 4:
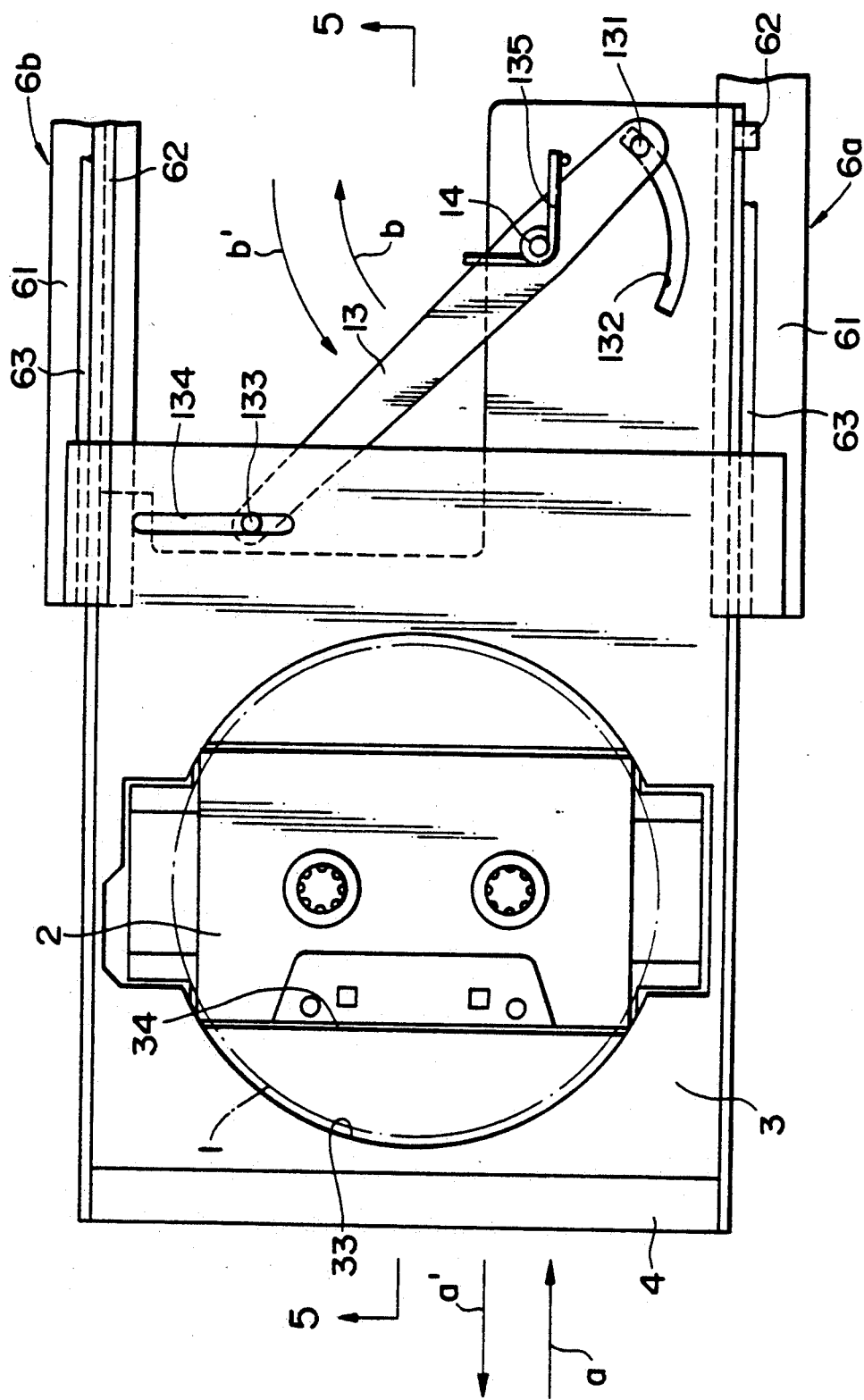
FIG. 4 is a plan view showing a disk tray and a cassette tray.

In FIGS. 1B and 2B, on the respective lower portions of the disk tray 3 and the cassette tray 4 at the respective backward positions, a disk deck 16 and a cassette deck 27 are arranged in such a state as being overlapped to each other in height. As shown in FIGS. 3A and 3B, the disk deck 16 is attached on the upper portion of the other attachment base 6b through a horizontal supporting shaft 17 so as to be rotatable in the vertical direction of the arrow <c> or <c'>. A turn table 19 rotatable by a spindle motor 18 and an optical pickup 20 and the like are attached on the upper portion of the disk deck 16. Also, a chucking magnet 21 arranged directly over the turn table 19 is suspended from the lower portion of a holder 22 attached so as to be located between the upper portions of both the attachment bases 6a and 6b.

A cam mechanism 23 for lifting the disk deck 16 in the direction of the arrow <c> or <c'> is mounted on the one attachment base 6a. The cam mechanism 23 has a cam lever 25 rotatable in the direction of the arrow <d> or <d'> (FIG. 1A) through a supporting shaft 24. A roller 252 attached on the movable and of the disk deck 16 is placed on a cam 251 having a vertical stepped portion and formed into a circular arc shape around the outer periphery of the cam lever 25.

In addition, a capstan 28 for driving a tape and a pair of right and left reel shafts 29 and the like are attached on the cassette deck 27 fixed on a chassis 5.

An interlocking lever stopper 30, on which the lower end of the pin 131 attached on the interlocking lever 13 is abutted from the direction of the arrow <a>, is rigidly fixed on the lower surface of a holder 22. Also, a cam drive projection 31 for driving a pin 253 provided on the upper portion opposed to the cam 251 of the cam lever 25 from the direction of the arrow <a> is rigidly fixed on the side surface of the rack plate 12.

Meanwhile, as shown in FIGS. 1A, 1B, 4A, 4B, 5A and 5B, a disk placing portion 33 shaped in a circular recess is horizontally formed on an approximately central portion of the horizontal upper surface of the disk tray 3 overlapped on the upper side. A rectangular cassette through hole 34 having a size larger than that of the cassette 2 is opened at the approximately central portion within the desk placing portion 33. Further, a cassette placing portion 35 having a rectangular and somewhat deeper recess is formed on the cassette tray 4 at such a position as to be directly under the cassette hole 34 when the disk tray 3 and the cassette tray 4 are located at respective backward positions. A cassette lifting plate 36 constituting the bottom surface of the cassette placing portion 35 is moved vertically with respect to the cassette tray 4, that is, in the direction of the arrow <e> or <e'>.

Next, the operation of the loading device will be briefly described with reference to FIGS. 1A to 5B.

As shown in FIGS. 1A and 2A, in the state where the disk tray 3 and the cassette tray 4 are projected outwardly from the front panel 7 in the direction of the arrow <a'> to the backward position, the disk placing portion 33 of the disk tray 3 and the cassette placing portion 35 of the cassette tray 4 are vertically overlapped to each other.

First, the cassette 2 is inserted through hole 34 within the cassette placing portion 35 of the cassette tray 4 through the disk tray 3, and is horizontally placed on the cassette lifting plate 36. Subsequently, the CD 1 is horizontally placed within the disk placing portion 33 of the disk tray 3.

As a motor 9 is normally rotated according to a loading command signal, a rack plate 12 is driven by the drive gear 111 normally driven through the belt transmission mechanism 10 and the gear train 11. Consequently, the cassette tray 4 is moved at a small stroke from the backward position as shown in FIGS. 1A and 2A to the forward position as shown in FIGS. 1B and 2B.

At this time, since the disk tray 3 is connected to the upper portion of the cassette tray 4 through the interlocking lever 13, the disk tray 3 is started, at the beginning, to move from the backward position together with the cassette tray 4 in the direction of the arrow <a>. Then, directly before the cassette tray 4 reaches the forward position, the pin 131 at one end of the interlocking lever 13 is abutted on the interlocking lever stopper 30 from the direction of the arrow <a>, so that the interlocking lever 13 is rotated in the direction of the arrow <b> against the spring 135 around the supporting shaft 14. Thus the pin 133 at the other end of the interlocking lever 13 pulls the disk tray 3 in the direction of the arrow <a> as pin 133 slides through the slot 134. The disk tray 3 is thereby moved in the direction of the arrow <a> at a velocity larger than that of the cassette tray 4 to the forward position as shown in FIGS. 1B and 2B.

When the disk tray 3 reaches the forward position, by the over-stroke of the rack plate 12 described later in the direction of the arrow <a>, the cam drive projection 31 drives the pin 253 of the cam lever 25 in the direction of the arrow <a>, as shown in FIG. 1B. Then, the cam lever 25 is rotated in the direction of the arrow <d> around the supporting shaft 24, so that the roller 253 of the disk deck 16 is driven from the lowering position to the lifting position by the cam 251 of the cam lever 25. Accordingly, the disk deck 16 is lifted in the direction of the arrow <c> from the lowering position as shown in FIG. 3A to the lifting position as shown in FIG. 3B. Subsequently, the CD 1 is pushed upwardly from the disk tray 3 by the turn table 19 and is attached on the turn table 19 so as to be held between the chucking magnet 21 and the same, and simultaneously, the optical pick up 20 comes close to the lower surface of the CD 1.

Figure 5B:
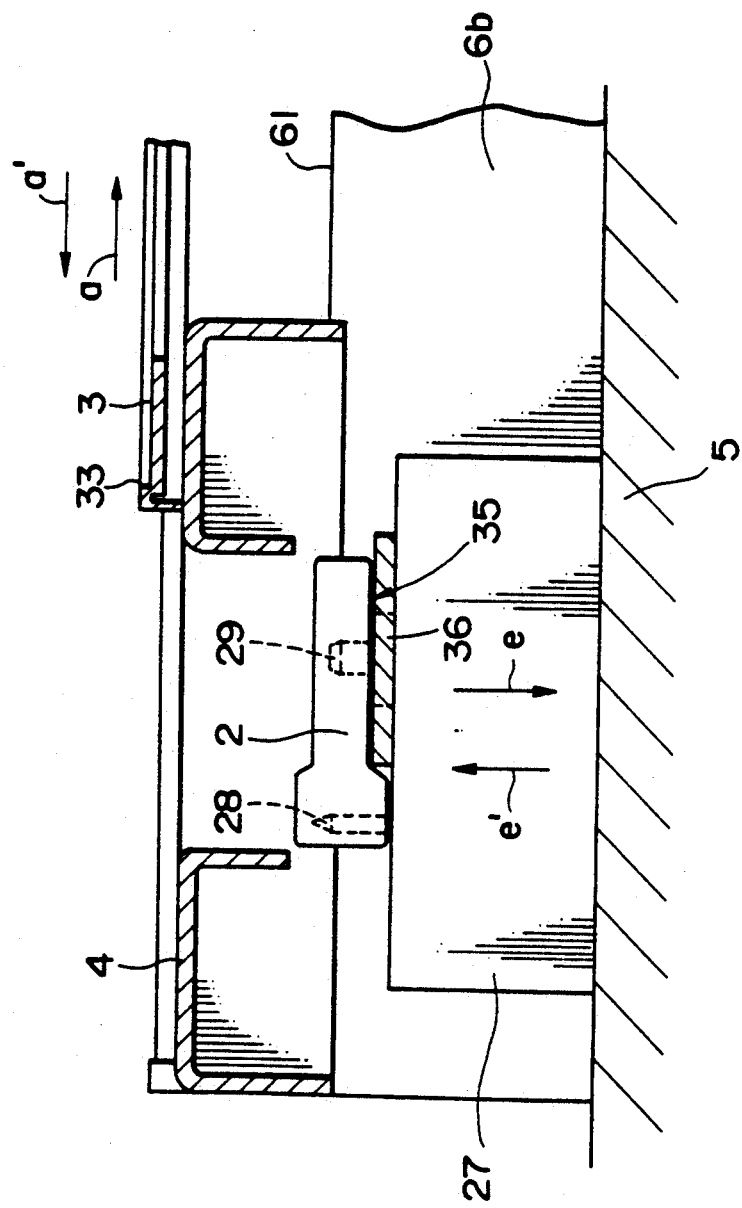
Figure 6:
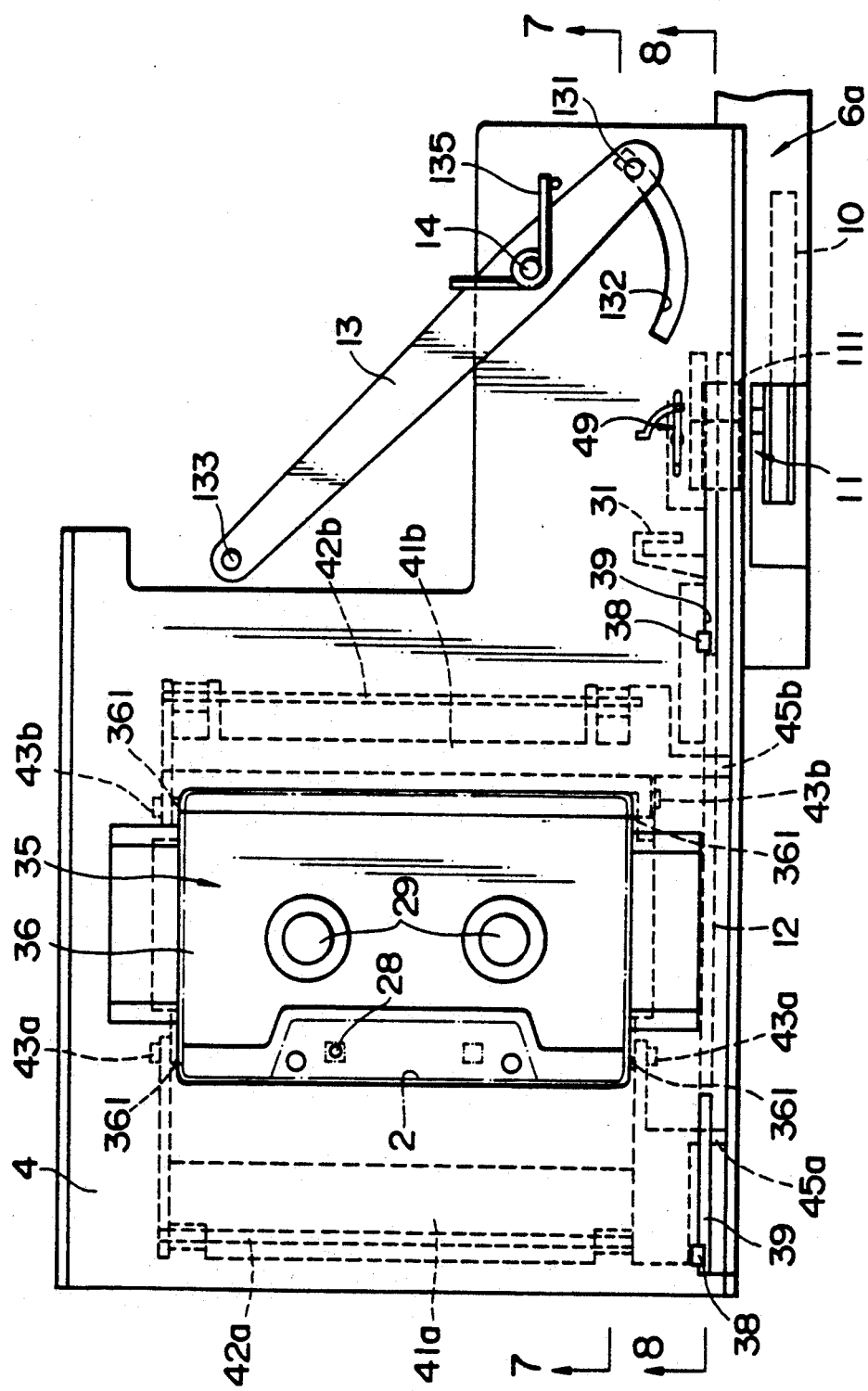
FIG. 6 is a plan view showing the cassette tray.

Meanwhile, by the over-stroke of the rack plate 12 in the direction of the arrow <a>, as described later, the cassette lifting plate 36 is lowered in the direction of the arrow <e> from the lifting position as shown in FIG. 5A to the lowering position as shown in FIG. 5B while being kept at the horizontal level. Accordingly, the cassette 2 placed on the cassette lifting plate 36 is horizontally mounted from the top on the capstan 28 and a pair of the reel shafts 29 and the like on the upper portion of the cassette deck 27.

As mentioned above, the series of loading actions of the CD 1 and the cassette 2 to the disk deck 16 and the cassette deck 27 are completed, and the motor 9 is stopped. After that, the disk deck 16 and the cassette deck 27 are respectively operated, and the reproducing (reading) of the CD 1 and the tape recording/reproducing of the cassette 2 are started.

In addition, the unloading actions of the CD 1 and the cassette 2 are executed in the reversed actions to those mentioned above by reverse rotation of the motor 9.

Referring to FIGS. 6 to 8B, the cassette loading mechanism will be explained.

In the rack plate 12, a pair of engaging claws 38 longitudinally attached in a spaced apart relation are freely fitted in a pair of slots 39 formed on the horizontal upper surface of the cassette tray 4 in parallel to the direction of the arrow <a> or <a'>, so that the rack plate 12 is movable in the direction of the arrow <a> or <a'> with respect to the cassette tray 4 by the length of the slot 39. The drive gear 111 is meshed with the rack 121 formed on the lower surface of the rack plate 12. The rack plate 12 can be locked and unlocked to and from the cassette tray 4 by the locking mechanism described later.

The cassette lifting mechanism 40 has a pair of lifting levers 41a and 41b arranged on both longitudinal sides with respect to the cassette lifting plate 36 in parallel to each other. The lifting levers 41a and 41b are vertically movable in the opposed directions, that is, of the arrows <f> and <f'> through a pair of longitudinal and parallel supporting shafts 42a and 42b, respectively. A pair of connecting shafts 43a and 43b provided on the ends on the opposed sides of the lifting levers 41a and 41b are freely fitted in horizontal slots 44a and 44b of a pair of longitudinal brackets 361 integrally formed on both the lateral ends of the cassette lifting plate 36, respectively.

A pair of longitudinal lifting pins 45a and 45b horizontally formed integrally with both the lifting levers 41a and 41b on the side surface of the rack plate 12 are freely fitted in a pair of slant guide grooves 46 longitudinally formed on the rack plate 12 in a spaced apart relation, respectively. In addition, the upper and lower ends 46a and 46b of both the slant grooves 46 are horizontally formed.

Figure 7A:
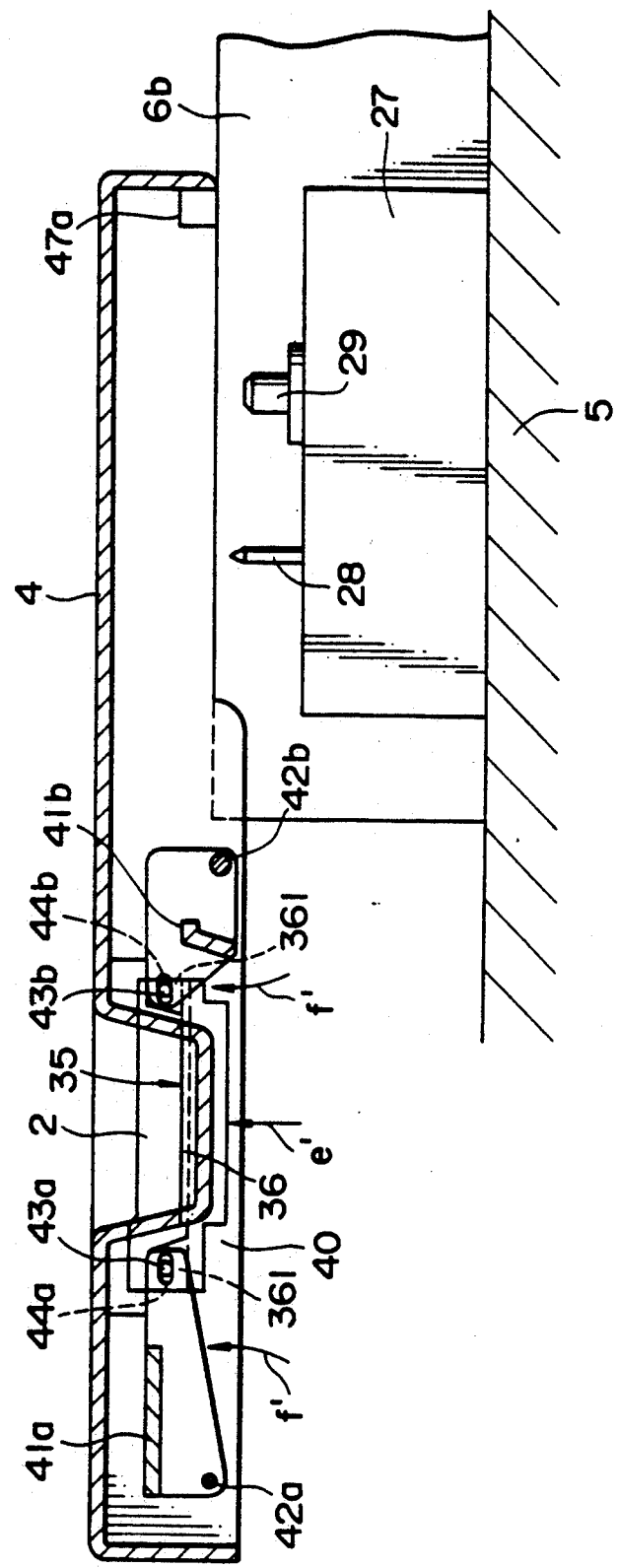
Figure 8A:
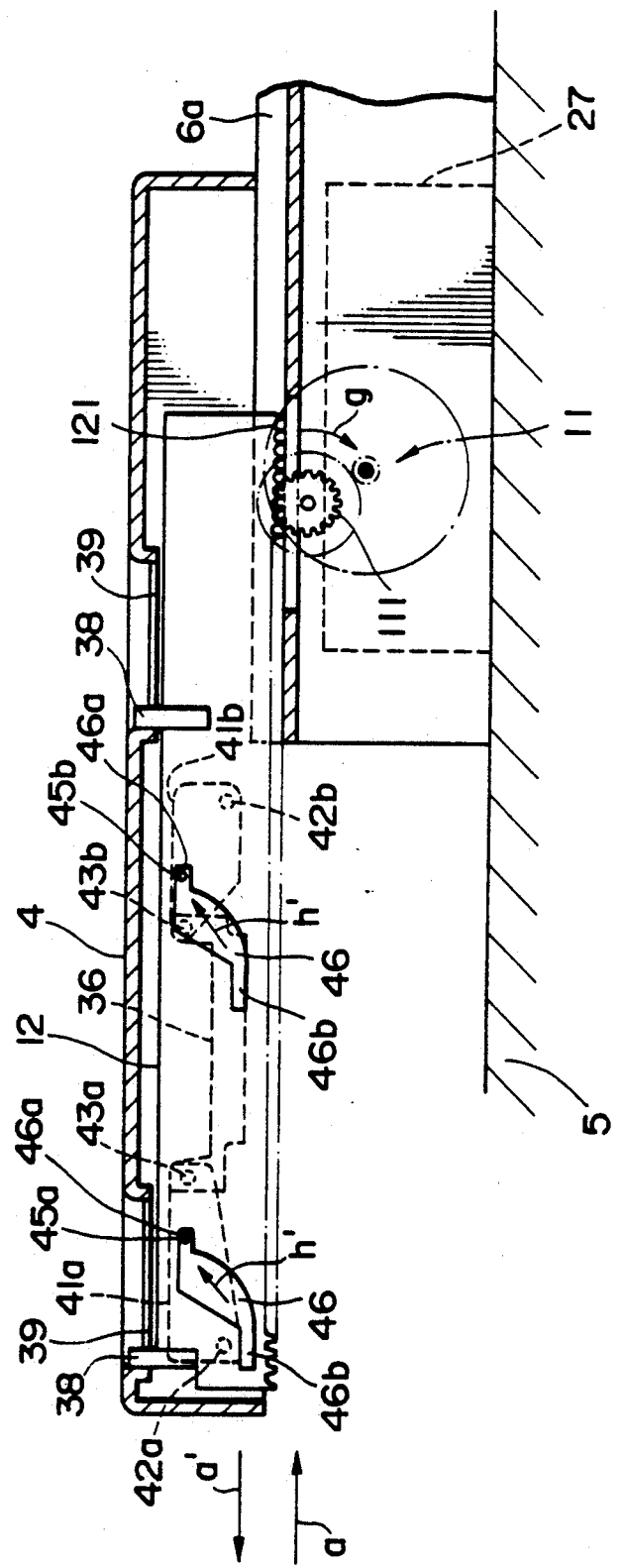

In the cassette lifting mechanism 40, as shown in FIG. 7A, the cassette tray 4 is moved backward in the direction of the arrow <a'>. In the state where the cassette tray 4 is abutted on the cassette tray stopper 47a, as shown in FIG. 8A, both the lifting pins 45a and 45b of both the lifting levers 41a and 41b are respectively lifted in the direction of the arrow <h'> toward the upper ends 46a of both the slant guide grooves 46 and are supported therein. Accordingly, both the lifting levers 41a and 41b are respectively rotated in the direction of the arrow <f'> around both the supporting pins 42a and 42b, thereby lifting the cassette lifting plate 36 in the direction of the arrow <e'> while keeping the horizontal level thereof.

In loading of the cassette 2, as shown in FIG. 8A, when the drive gear 111 is normally driven in the direction of the arrow <g> to drive the rack plate 12 in the direction of the arrow <a> through the rack 121, the rack plate 12 is locked to the cassette tray 4 by the locking mechanism described later, and consequently, the rack plate 12 is moved integrally with the cassette tray 4 in the direction of the arrow <a>.

As shown in FIG. 7B, when the cassette tray 4 is moved in the direction of the arrow <a> until it is abutted on the cassette stopper 47b, the locking mechanism described later is instantaneously released, after which the rack plate 12 is moved in the direction of the arrow <a> with respect to the cassette tray 4 by the over-stroke S1, as shown in FIG. 8B.

Then, as shown in FIG. 8B, both the lifting pins 45a and 45b of both the lifting levers 41a and 41b are respectively slipped out in the direction of the arrow <h> from the upper ends 46a to the lower ends 46b of both the slant guide grooves 46 of the rack plate 12. Consequently, as shown in FIG. 7B, both the lifting levers 41a and 41b are rotated in the direction of the arrow <f> around both the supporting shafts 42a and 42b, thereby lowering the cassette lifting plate 36 in the direction of the arrow <e>, while keeping the horizontal level thereof. The cassette 2 placed on the cassette lifting plate 36 is thereby lowered in the direction of the arrow <e>, and is downwardly mounted to the capstan 28 and a pair of the reel shafts 29 and the like on the cassette deck 27.

In addition, in unloading of the cassette 2, as shown in FIG. 8B, the rack plate 12 is moved in the direction of the arrow <a'> with respect to both the slant guide grooves 46 by the over-stroke S1 by the drive gear 111 reversely rotated in the direction of the arrow <g>, and thereat, both the lifting pins 45a and 45b of both the lifting levers 41a and 41b are respectively pushed in the direction of the arrow <h'> as shown in FIG. 8A by both the slant guide grooves 46. Both the lifting levers 41a and 41b are respectively rotated in the direction of the arrow <f'> as shown in FIG. 7A, and thereby the cassette lifting plate 36 is lifted in the direction of the arrow <e'> while being kept at the horizontal level, so that the cassette 2 is lifted upwardly from the capstan 28 and a pair of the reel shafts 29 and the like on the cassette deck 27. After that, the cassette tray 4 is moved backward as shown in FIG. 7A by the rack plate 12 sequentially driven in the direction of the arrow <a'> by the drive gear 111.

Next, the locking mechanism 49 of the rack plate 12 to the cassette tray 4 will be explained with reference to FIGS. 9A to 9C.

The locking mechanism 49 has a lock lever 51 which is attached on the lower portion of the upper surface of the cassette tray 4 so as to be rotatable in the horizontal direction of the arrow <i> or <i'> through a supporting shaft 50. The lock lever 51 is rotatably biased in the direction of the arrow <i> by the spring 53 attached between the one end 51a thereof and a spring engaging portion 52 provided on the cassette tray 4. In addition, the guide pin 54 formed integrally with the upper portion on the other side 51b of the lock lever 51 is freely fitted in the circular arc hole 55 formed on the cassette tray 4. The lock pin 56 is formed integrally with the extreme end of the other end 51b of the lock lever 51. The lock pin 56 is formed integrally with the extreme end of the other end 51b of the lock lever 51. The lock pin 51 is trailed downwardly from the lock lever 51, and is removably engaged for locking with the portion 571, a recessed portion of a plate 57 formed integrally with the side surface of the end portion of the rack plate 12 in the direction of the arrow <a>. On the position near the cam lever 25 provided on the one attachment base 6a, the lock lever stopper 58 on which the lock pin 56 is abutted in the direction of the arrow <A> is rigidly fixed. In addition, a lock pin guide surface 581 is formed on the lock lever stopper 58 for controlling rotation of the lock pin 56 in the direction of the arrow <i>.

Figure 9A:
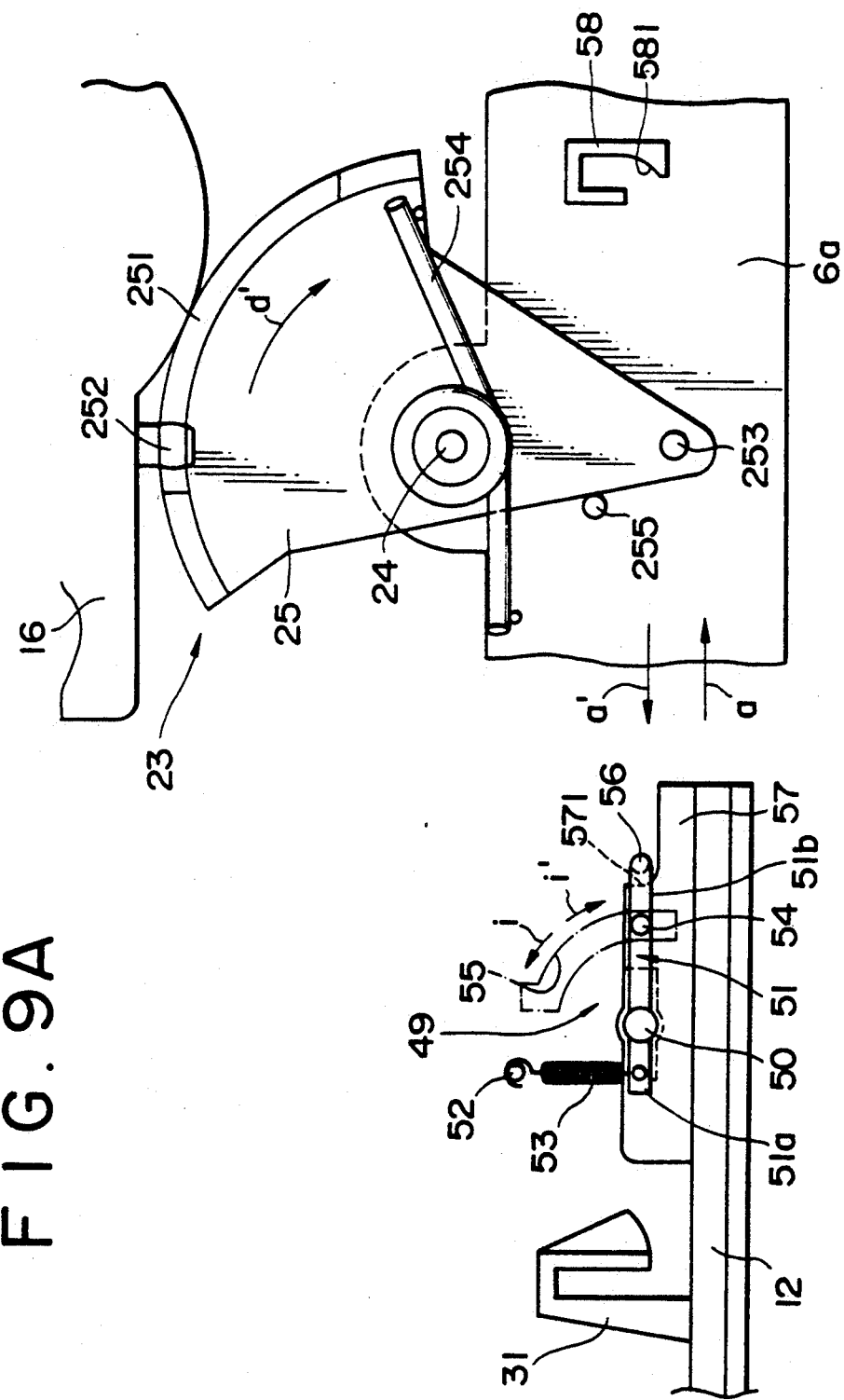

By use of the locking mechanism 49, as shown in FIG. 9A, in the state where the rack plate 12 is moved backward in the direction of the arrow <a'> together with the cassette tray 4, the lock pin 56 of the lock lever 51 rotatably energized by the spring 53 in the direction of the arrow <i'> is engaged with the portion 571 of the plate 57 of the rack plate 12, so that the rack plate 12 is locked into the cassette tray 4.

Accordingly, as the rack plate 12 is driven in the direction of the arrow <a>, the portion 571 of the lock plate 57 pushes the lock pin 56 in the direction of the arrow <a>, thereby moving the cassette tray 4 in the direction of the arrow <a> through the lock lever 51.

Figure 9B:
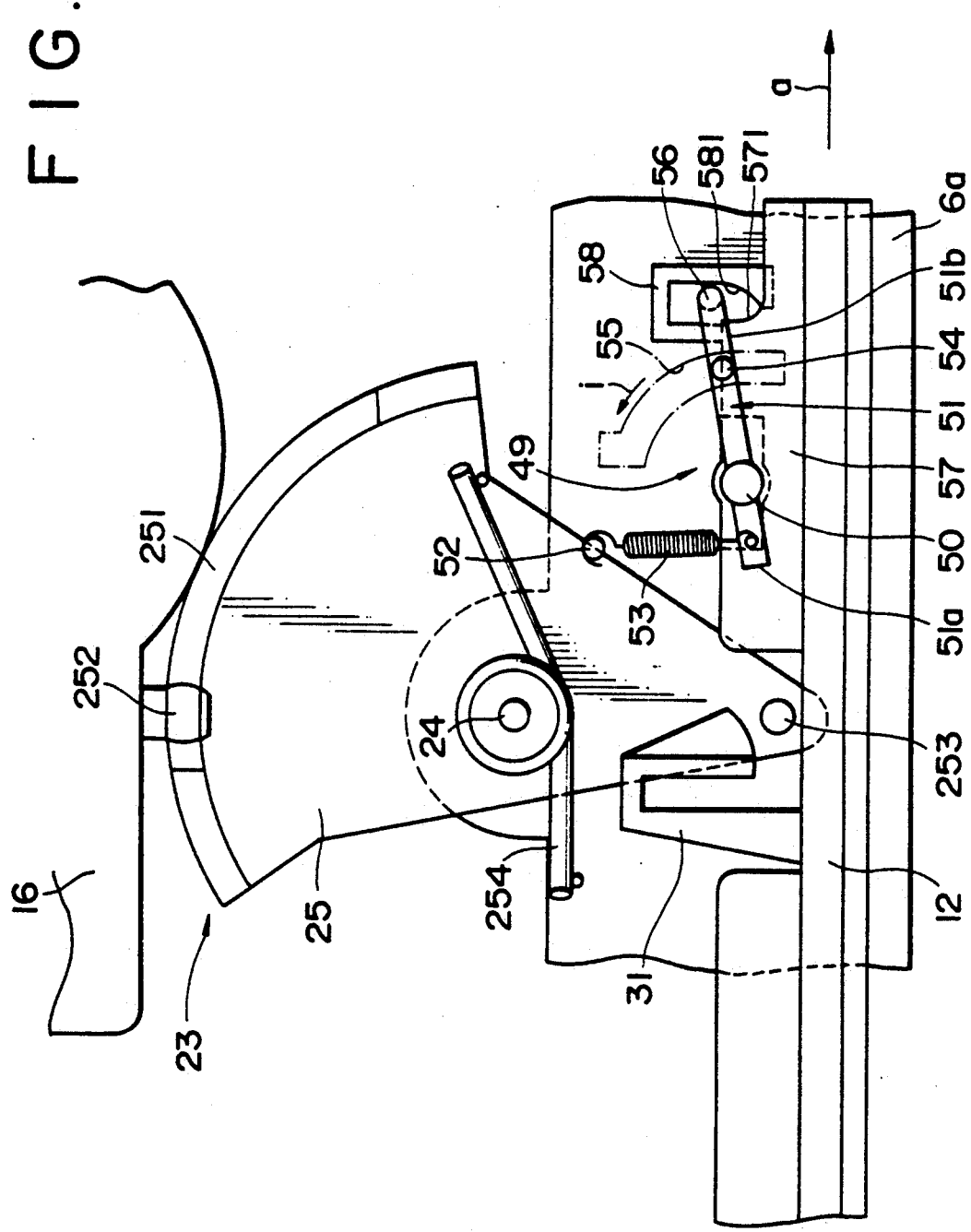

When the cassette tray 4 is moved in the direction of the arrow <a> toward the forward position, as shown in FIG. 9B, the lock pin 56 of the lock lever 51 is abutted on the lock pin guide surface 581 of the lock lever stopper 58 from the direction of the arrow <a>. Then, the lock pin 56 is guided in the direction of the arrow <i> by the lock pin guide surface 581, so that the lock lever 51 is rotated in the direction of the arrow <i> against the spring 53 and the lock pin 56 is automatically released from the portion 571 of the plate 57 of the rack plate 12 in the direction of the arrow <i> thereby releasing locking of the rack plate 12 to the cassette tray 4.

Accordingly, as shown in FIG. 9C, only the rack plate 12 can be moved in the direction of the arrow <a> with respect to the cassette tray 4 by the over-stroke S1.

In addition, the cam lever 25 as shown in FIGS. 9A to 9C is rotatably energized in the direction of the arrow <d'> by the spring 254 and is abutted on the cam lever stopper 255 provided on the attachment base 6a. In loading of the CD 1, as shown in FIG. 9C, when the rack plate 12 is moved in the direction of the arrow <a> by the over-stroke S1, the cam drive projection 31 of the rack plate 12 pushes the pin 253 of the cam lever 25 from the direction of the arrow <a'> to the direction of the arrow <a>, so that the cam lever 25 is rotated in the direction of the arrow <d> against the spring 254 from the backward position as shown in FIG. 1A to the forward position as shown in FIG. 1B. In addition, in loading of the CD 1, as shown in FIG. 9C, during the rack plate 12 is moved in the direction of the arrow <a'> by the over-stroke S1, the cam lever 25 is moved backward in the direction of the arrow <d'> from the forward position as shown in FIG. 1B to the backward position as shown in FIG. 1A by the spring 254.

Although the specific embodiment has been shown and described, it will be evident that the present invention is not limited to the embodiment and the various modifications may be made within the technical thought of the present invention.

For example, in the above embodiment, the desk tray 3 is connected with the cassette tray 4 by the interlocking lever 13; however, there may be provided an interlocking and releasing mechanism between the desk tray 3 and the cassette tray 4 thereby enabling the loading and unloading of the desk tray 3 and the cassette 4, integrally or separately.

Further, the present invention is not limited to the recording/reproducing device for the compact desk and the tape cassette, but may be applicable for a loading device of various desk-like recording mediums for recording and/or reproducing and cassettes accommodating various recording mediums such as a tape recording medium and a desk recording medium.

As mentioned above, according to the present invention, since the desk tray and the cassette tray for simultaneously loading the desk and the cassette are arranged vertically in two stages and are horizontally moved in the same direction, it is possible to improve the space efficiency and reduce the lateral width of the recording-/reproducing device and hence to miniaturize the recording/reproducing device. Further, since the desk tray and the cassette tray are moved by one carrying means, it is possible to simplify the structure of the loading mechanism.

What is claimed is:

1. A loading device comprising:
   a first tray having a disk placing portion for holding a disk;
   a second tray having a cassette placing portion for holding a cassette accommodating a recording medium;
   carrying means for horizontally carrying said first and second trays between a first position where said first and second trays are pulled out from a main body of said device and a second position where said first and second trays are retracted within said main body of said device; and
   a disk recording and reproducing portion for recording and reproducing information contained on said disk placed on said first tray and carried to said second position by said carrying means, and a cassette recording and reproducing portion for recording and reproducing information contained on the medium accommodated in said cassette placed on said second tray and carried to said second position by said carrying means,
   wherein said first tray and said second tray vertically overlap relative to each other and are carried in the same direction by said carrying means.

2. A loading device according to claim 1, wherein said first tray is arranged in register with and above said second tray, and a cassette through hole is defined in said first tray for passing said cassette through said first tray and placing said cassette within said cassette placing portion of said second tray.

3. A loading device according to claim 1, wherein said disk recording and reproducing portion and said cassette recording and reproducing portion are respectively arranged at different positions along the carrying direction of said first and second trays.

4. A loading device according to claim 1, wherein said carrying means carries one of said first or second trays, and further includes interlocking means connecting said first and second trays together so that said one tray carried by said carrying means carries the other tray.

5. A loading device according to claim 1, wherein
   said disk recording and reproducing portion and said cassette recording and reproducing portion are respectively arranged at different positions along the carrying direction of said first and second trays; and
   said carrying means includes interlocking means for connecting said first and second trays together and moving them in an interlocked state in first and second strokes respectively,
   wherein said carrying means carries said first tray in said first stroke to a position corresponding to its respective recording or reproducing portion and carries said second tray in said second stroke to a position corresponding to its respective recording or reproducing portion.

* * * * *